(12) United States Patent
Pack et al.

(10) Patent No.: US 8,224,056 B2
(45) Date of Patent: Jul. 17, 2012

(54) METHOD FOR COMPUTED TOMOGRAPHY MOTION ESTIMATION AND COMPENSATION

(75) Inventors: Jed Douglas Pack, Glenville, NY (US); Peter Michael Edic, Albany, NY (US); Bernhard Erich Hermann Claus, Niskayuna, NY (US); Maria Iatrou, Clifton Park, NY (US); James Vradenburg Miller, Clifton Park, NY (US)

(73) Assignee: General Electronic Company, Schenectady, NY (US)

( * ) Notice: Subject to any disclaimer, the term of this patent is extended or adjusted under 35 U.S.C. 154(b) by 184 days.

(21) Appl. No.: 12/638,693

(22) Filed: Dec. 15, 2009

(65) Prior Publication Data

US 2011/0142313 A1  Jun. 16, 2011

(51) Int. Cl.
*G06K 9/00* (2006.01)

(52) U.S. Cl. .................. 382/131; 378/4; 378/20

(58) Field of Classification Search .......... None
See application file for complete search history.

(56) References Cited

U.S. PATENT DOCUMENTS

| 6,236,705 | B1 | 5/2001 | Stergiopoulos et al. | |
|---|---|---|---|---|
| 6,332,013 | B1 | 12/2001 | Hsieh | |
| 6,751,284 | B1 * | 6/2004 | Claus et al. | 378/22 |
| 6,894,494 | B2 | 5/2005 | Stergiopoulos et al. | |
| 7,702,063 | B2 * | 4/2010 | Koehler et al. | 378/4 |
| 2004/0136490 | A1 * | 7/2004 | Edic et al. | 378/4 |
| 2006/0002632 | A1 | 1/2006 | Fu et al. | |
| 2006/0239585 | A1 | 10/2006 | Valadez et al. | |
| 2007/0036417 | A1 | 2/2007 | Argiro et al. | |
| 2007/0053482 | A1 * | 3/2007 | Kohler et al. | 378/8 |
| 2008/0100621 | A1 * | 5/2008 | Aharon et al. | 345/424 |
| 2009/0034817 | A1 | 2/2009 | Boese et al. | |
| 2010/0121183 | A1 * | 5/2010 | Taguchi et al. | 600/427 |

FOREIGN PATENT DOCUMENTS

| EP | 1249710 A2 | 10/2002 |
|---|---|---|
| WO | WO 2006/051467 A2 * | 5/2006 |

OTHER PUBLICATIONS

Iatrou et al. (Nov. 2010) "Coronary artery motion estimation and compensation: a feasibility study." 2010 IEEE Nuclear Science Symp. Conf. Record, pp. 2819-2821.*

Li et al. (Dec. 2005) "Motion correction for improved target localization with on-board cone-beam computed tomography." Physics in Medicine and Biology, vol. 51 pp. 253-267.*

(Continued)

*Primary Examiner* — Jingge Wu
*Assistant Examiner* — Barry Drennan
(74) *Attorney, Agent, or Firm* — Ziolkowski Patent Solutions Group, SC (57) ABSTRACT

A method and system for motion estimation and compensation are disclosed. Initially, a set of one or more initial images is reconstructed using acquired imaging data. Further, one or more regions of interest are identified in this set of reconstructed initial images. At least a set of filters is applied to the identified regions of interest to generate a sequence of filtered images. Particularly, each of the filtered images in the generated sequence of filtered images includes data acquired near a different reference point. Subsequently, a motion path corresponding to each region of interest is determined based on one or more correspondences in the sequence of filtered images.

25 Claims, 4 Drawing Sheets

OTHER PUBLICATIONS

Paul Delogne, Laurent Cuvelier, Benoit Maison, Beatrice Van Caillie and Luc Vandendorpe; "Improved Interpolation, Motion Estimation, and Compensation for Interlaced Pictures"; 10Pages, Sep. 1994.

Ge Wang and Michael W Vannier; "Preliminary Study on Helical CT Algorithms for Patient Motion Estimation and Compensation"; 7Pages, Jun. 1995.

Richard P Kleihorst, Reginald L Lagendijk and Jan Biemond; "Noise reduction of image Sequences using motion compensation and signal decomposition"; 11Pages, Mar. 1995.

Mohammad Dawood, Norbert Lang, Xiaoyi Jiang and Klaus P. Schäfers; "Lung Motion Correction on Respiratory Gated 3-D PET/CT Images"; IEEE Transactions on Medical Imaging, vol. 25, No. 4, Apr. 2006; 10Pages.

Verdu et al., "Active Contours For Heart Motion-Compensated Reconstruction In Computed Tomography," Digital Signal Processing, 2002, pp. 1129-1132.

* cited by examiner

METHOD FOR COMPUTED TOMOGRAPHY MOTION ESTIMATION AND COMPENSATION

BACKGROUND

Embodiments of the present invention relate generally to imaging techniques and more particularly to computed tomography (CT) systems and methods for improving image resolution.

Cardiac imaging is a critical function in clinical applications. Characterization of myocardial motion enables better understanding of the physiology of a heart and early detection of cardiovascular diseases. Particularly, cardiologists employ CT angiography (CTA) images to diagnose and characterize the extent of heart disease. Imaging the heart, however, is particularly challenging, as the heart is a moving object that rotates, translates and deforms non-rigidly in a three-dimensional (3D) space. Conventional CT image reconstruction methods generally assume that an object is stationary during data acquisition. In cardiac imaging, application of the conventional reconstruction methods may result in image blurring and other motion artifacts in the reconstructed images due to heart motion. The artifacts can severely affect a diagnosis that uses these reconstructed images, especially if the imaged features are small. For example, plaques formed in coronary arteries are generally indicative of a risk of a potential heart attack, but are difficult to image due to their small size. Non-optimal reconstruction of such small features may result in incorrect diagnosis resulting in serious consequences. Therefore, an ability to produce high-resolution images is critical to clinical diagnosis.

Conventional imaging techniques employ brute force approaches to mitigate effects of motion artifacts in CT imaging. Some of these techniques include employing two X-ray tubes or detector pairs angularly offset from each other, a heavier or higher power tube combined with spinning a gantry faster, or combining data from successive heart cycles. These techniques, however, incur considerable costs, are mechanically restrictive or rely on beat-to beat repeatability of cardiac motion that is practically difficult to achieve. Another approach utilized in present day scanners is the reconstruction of images at multiple phases in an attempt to select a volume reconstructed at the quiescent phase of the heart. However, the temporal resolution in currently available CT scanners does not suffice for motion free cardiac imaging of all coronary segments at higher heart rates or highly variable heart rates. Certain other techniques, not commercially available but under investigation, relate to model-based estimation requiring reconstructions of several cardiac phases to estimate the motion. Such techniques require longer X-ray exposure time and involve a number of computational challenges.

It may therefore be desirable to develop an efficient technique to improve resolution of acquired CT images by reducing motion induced blurring and other motion artifacts. Additionally, there is a need for a low cost technique that minimizes the amount of scan data required for motion estimation, thereby minimizing dose administered to a patient.

BRIEF DESCRIPTION

In accordance with aspects of the present technique, an imaging system for producing high-resolution images is described. To that end, the imaging system may include a data acquisition system (DAS) for acquiring data corresponding to an initial image. Further, the imaging system may also include an image processor coupled to the DAS for reconstructing a set of one or more initial images using the acquired data. The DAS may identify one or more regions of interest (ROIs) in the set of reconstructed initial images. Typically, the ROIs may include at least a portion of the object 22. Additionally, the DAS may apply at least a set of filters to the identified ROIs to generate a sequence of filtered images such that each filtered image in the sequence of filtered images comprises data acquired near a different reference point. Subsequently, the DAS may estimate a motion path for each region of interest based on one or more correspondences in the sequence of filtered images.

In accordance with another aspect of the present technique, a computed tomography (CT) imaging system is disclosed. The CT system may include at least one radiation source, for generating a conical beam for imaging an object. To that end, the radiation source and the object may move relative to each other around a determined axis. Further, the CT system may include a detector assembly coupled to the radiation source. Additionally, the CT system may include a computing device coupled to detector assembly for estimating motion of the object. The computing device may further include one or more image processors for performing one or more motion estimation processes. These processes may include reconstructing a set of one or more initial images using acquired data and identifying one or more regions of interest in the set of reconstructed initial images. The image processors may further apply at least a set of filters to the identified regions of interest to generate a sequence of filtered images. It may be noted that each of the filtered images in the sequence comprises data acquired near a different reference point. Subsequently, the image processors may estimate a motion path for each region of interest based on one or more correspondences in the sequence of filtered images.

In accordance with yet another aspect of the present technique, a method for motion estimation is presented. The method includes reconstructing a set of one or more initial images using acquired data and identifying one or more regions of interest in the set of reconstructed initial images. Further, at least a set of filters may be applied to the identified regions of interest to generate a sequence of filtered images. Each filtered image in the sequence may comprise data acquired near a different reference point. Subsequently, a motion path for each region of interest may be estimated based on one or more correspondences in the sequence of filtered images.

In accordance with a further aspect of the present technique, a method for compensating for estimated motion is described. The method includes determining a time period during data acquisition corresponding to a sector of a Fourier space. Further, a determined motion vector corresponding to the determined time period may be identified. Subsequently, the sector of the Fourier space may be modulated based on the identified motion vector to compensate for the identified motion.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The following description presents a technique for estimating and compensating for motion of an object of interest in imaging applications. Particularly, embodiments illustrated hereinafter disclose an imaging system, a computed tomography (CT) system, and methods for motion estimation and compensation in imaging applications. Although exemplary embodiments of the present technique are described in the context of a CT system, it will be appreciated that use of the present technique for improving the temporal resolution of images in various other imaging applications and systems is also contemplated. Some of these systems include dual source, two detector CT systems, multi-source CT systems, multi-detector systems, X-Ray systems, positron emission tomography (PET) scanners, single photon emission computed tomography (SPECT) scanners, microscopes, digital cameras, charge coupled devices, or combinations thereof. An exemplary environment that is suitable for practicing various implementations of the present technique is discussed in the following sections with reference to FIGS. 1-2.

Figure 1:
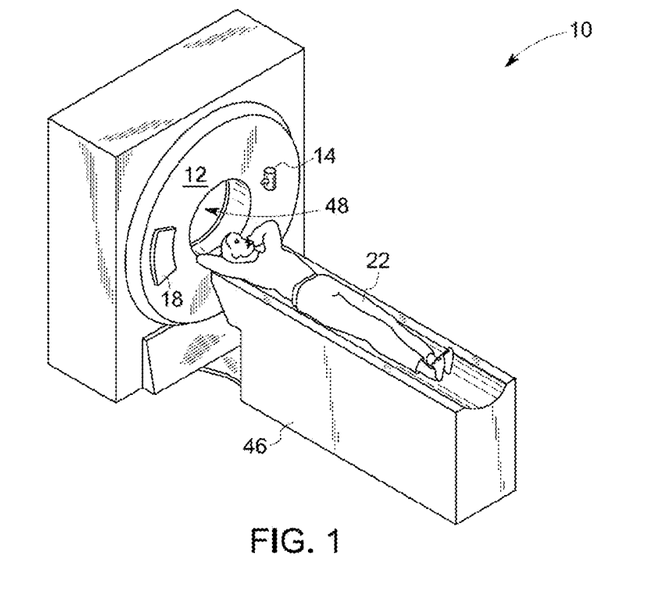
FIG. 1 is a pictorial view of an exemplary CT imaging system.
Figure 2:
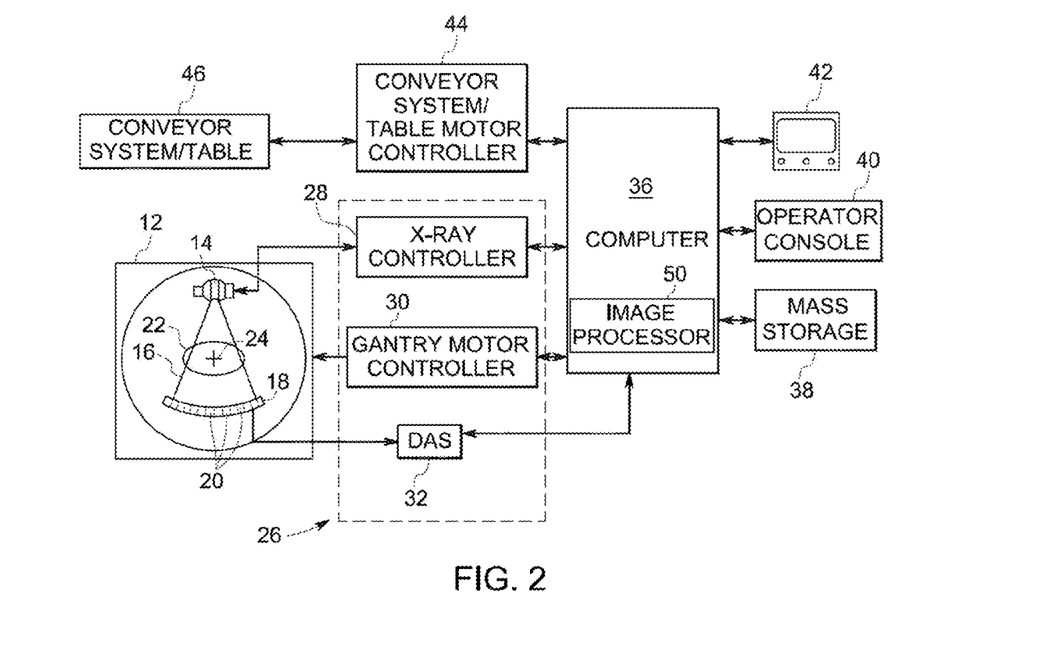
FIG. 2 is a block schematic diagram of the system illustrated in FIG. 1, in accordance with aspects of the present technique.

FIGS. 1 and 2 illustrate an exemplary imaging system 10 for acquiring and processing image data. In one embodiment, the imaging system 10 is a CT system including a gantry 12. The gantry 12 may include at least one X-ray radiation source 14 that projects a beam of X-ray radiation 16 towards a detector array 18 positioned on the opposite side of the gantry 12. By way of an example, the X-ray beam 16 may be a fan beam, a cone beam, or a parallel beam. Further, the detector array 18 may include a plurality of detector elements 20 that together sense the projected X-ray beam 16 that passes through an object 22 such as a medical patient. Each detector element 20 may produce an electrical signal that represents the intensity of an impinging X-ray beam 16, which may be used to estimate the attenuation of the X-ray beam 16 as it passes through the object 22. In some embodiments, the detector array 18 may be fabricated in a multi-slice configuration for sensing the X-ray beam 16 passing through the object 22. In a multi-slice configuration, the detector array 18 includes a plurality of rows of cells or detector elements 20 that may typically be arranged in a parallel configuration for acquiring projection data.

Further, during a scan to acquire the projection data, the gantry 12 and the components mounted thereon may rotate about a center of rotation 24. However, in certain embodiments where a projection angle relative to the imaged object 22 varies as a function of time, the mounted components may be configured to move along a general curve rather than along a segment of a circle. Typically, the projection data are collected for an angular range of at least 180 degrees plus a fan angle of the X-ray beam 16, where the timing of the data collection is chosen to be close to a desired phase of the cardiac cycle. In some embodiments, however, projection data may be collected for an angular range that may be smaller or greater than 180 degrees plus the fan angle of the X-ray beam 16.

In accordance with aspects of the present technique, the rotation of the gantry 12 and the operation of the X-ray source 14 for acquiring the desired projection data may be governed by a control mechanism 26 of the system 10. In one embodiment, the control mechanism 26 may include an X-ray controller 28 that provides power and timing signals to the X-ray source 14 and a gantry motor controller 30 that controls the rotational speed and position of the gantry 12. The control mechanism 26 may also include a data acquisition system (DAS) 32 for sampling analog data from the detector elements 20 and converting the data to digital signals for subsequent processing. The data sampled and digitized by the DAS 32 is input to a computer 36. The computer 36 may store the data in a mass storage 38 or in other storage media, such as, a floppy disk drive, a compact disk-read/write (CD-R/W) drive, or a Digital Versatile Disc (DVD) drive. The other storage media may be used for reading and writing the sampled and digitized data onto removable media such as a floppy disk, a compact disk, or a DVD. These devices and storage media, in one embodiment, are used to transfer the acquired projection data from the system 10 to other devices that are communicatively coupled to the computer 36 over a communications network for further processing. Alternatively, the devices and storage media may be used to input machine-readable instructions that are processed by the computer 36.

Further, the computer 36 may receive commands and scanning parameters from an operator via console 40 that may include a keyboard (not shown). In addition, a display 42 may allow the operator to observe object images and other data received from the computer 36. In some embodiments, the operator may use the console 40 to select a particular region of the object image on the display 42 for further processing. By way of an example, the operator may select a coronary artery segment from an image of a heart available on the display 40 for selectively applying a motion estimation or a motion compensation technique. To that end, the computer 36 may also use operator supplied commands and parameters to provide control signals and information to the DAS 32, the X-ray controller 28 and the gantry motor controller 30. Additionally, the computer 36 may also operate a conveyor system or a table motor controller 44 that, in turn, controls a conveyor system or a motorized table 46 in order to appropriately position the object 22, such as the patient, in the gantry 12. In a step-and-shoot mode, for example, the table 46 may be held stationary during the acquisition of at least part of the projection data. In case of a helical scan, however, the table 46 may be moved to move portions of the object 22 through a gantry opening 48 while projection data is being collected and the gantry 12 is rotating to provide a desired "helical pitch." The helical pitch, as used herein, is a measure of the amount of movement of table 46 per rotation of the gantry 12.

Generally, a rate of rotation of the gantry 12 may be adjusted based on the method of data acquisition. In a single segment reconstruction for example, the rate of rotation of the gantry 12 may be based on an acquired electrocardiogram signal corresponding to the patient, and may typically be set to a maximum possible value corresponding to the scanner. In a multi-segment reconstruction, however, the rate of rotation of the gantry 12 may be based on a desired cardiac cycle of the patient or a measured average cardiac cycle rate. Particularly, the DAS 32 may collect projection data from two or more heart cycles such that the combined collected data corresponds to at least 180 degrees plus fan angle for the desired cardiac phase. To that end, in different embodiments, the projection data may be collected by employing a helical scan, a step and shoot acquisition, one or more segments of a circular scan, and so on. In further embodiments, a detector wide enough to cover the whole heart or organ of interest in one rotation may be employed to acquire projection data from one or more heart cycles for performing a single segment or a multi-segment reconstruction.

Accordingly, the DAS 32 may be used to acquire the projection data corresponding to the object 22 for a range of views. The DAS 32 may further acquire information corresponding to a view angle of the radiation source 14 at the time of acquisition of the projection data. Alternatively, the gantry motor controller 30 may measure a view angle of the radiation source 14 at the time of acquisition of the projection data. Particularly, the acquired information may facilitate a determination of which components of the image are acquired at which instant of time. Further, this acquired information may be utilized to determine the source location at the particular instant of time, and therefore determine the direction of the object motion that can be best captured at the particular instant of time and view angle.

In one embodiment, the computer 36 may receive the projection data and the source location information from the DAS 32. The computer 36 may further be configured to pre-process the object image to extract information about the location of a structure of interest, for example, a centerline of a coronary artery tree identified after processing the volume of images at a desired cardiac phase. To that end, the computer 36 may include an image processor 50, one or more subsystems, a specialized circuit, or one or more general purpose processors to perform the functions recited herein above along with certain additional image processing steps. In one embodiment, the processing steps may include: a "first pass" (non motion compensated) reconstruction of one or more image datasets, identification of one or more regions of interest (ROIs), an estimation of object motion within the identified ROIs and a compensation for the estimated motion. The processing steps performed by the computer 36 for reconstructing a high quality CT image, in accordance with aspects of the present technique, will be discussed in greater detail with reference to FIG. 3.

Figure 3:
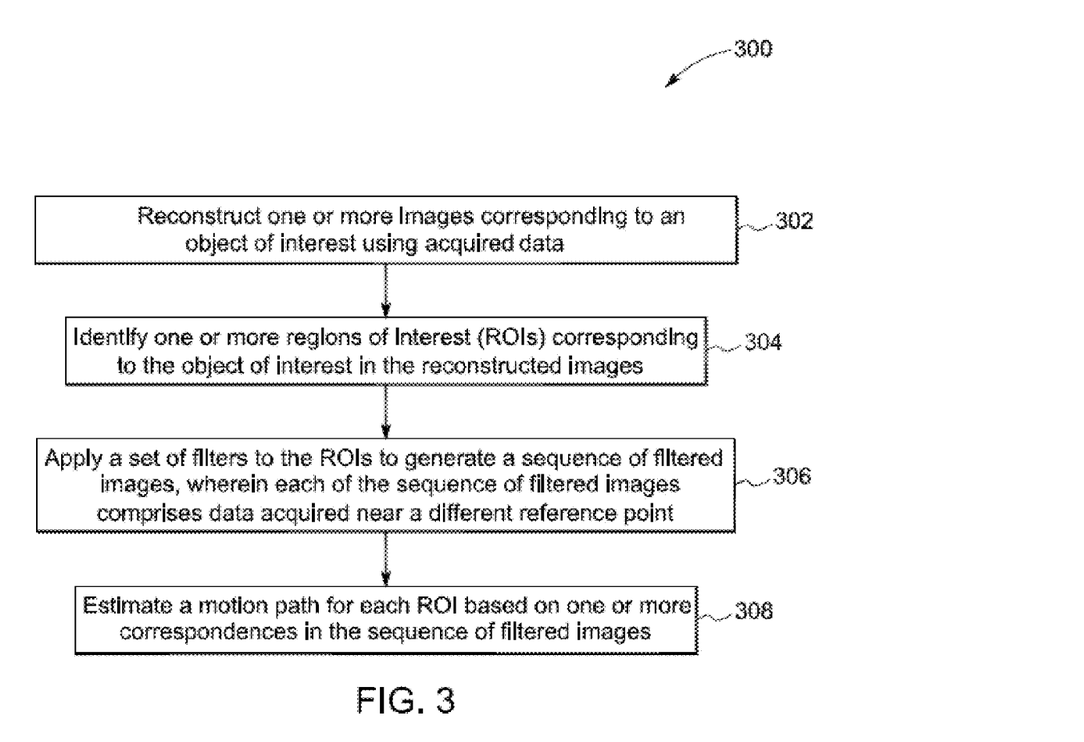
FIG. 3 is a flowchart depicting an exemplary method for CT motion estimation, in accordance with aspects of the present technique.

Turning to FIG. 3, a flowchart 300 depicting an exemplary method for estimating motion of an object of interest in an imaging system, such as the CT imaging system 10 of FIG. 1, is illustrated. The method may be described in a general context of computer executable instructions that may be located in either or both of local and remote computer storage media, including memory storage devices. Further, in FIG. 3 the method is illustrated as a collection of blocks in a logical flow graph, which represents a sequence of operations that may be implemented in hardware, software, or combinations thereof. The various operations are depicted in the blocks to illustrate the functions that are performed generally during image data acquisition, image reconstruction and motion estimation phases. In the context of software, the blocks represent computer instructions that, when executed by one or more image processors, perform the recited operations. The order in which the method is described is not intended to be construed as a limitation, and any number of the described blocks may be combined in any order to implement the method disclosed herein, or an equivalent alternative method. Additionally, individual blocks may be deleted from the method without departing from the spirit and scope of the subject matter described herein.

In accordance with aspects of the present technique, the following description provides an exemplary method for estimating motion of an object or a structure of interest. It may be noted that the embodiments disclosed herein are particularly suited for the motion estimation and image reconstruction of a pseudo cylindrical or a high-curvature structure such as the coronary artery. As used herein, the term "high-curvature" implies that a large fraction of view angles may be tangential to some edge corresponding to the object of interest.

The method begins at step 302, where an initial reconstruction of an image of the object using projection data acquired in a particular cardiac phase is performed. The projection data may be used to reconstruct one or more two-dimensional (2D) images or three-dimensional (3D) images corresponding to the object. Particularly, in one embodiment, a pair of shifted images is reconstructed. In certain embodiments, the projection data may be acquired from less than a full scan of data, thereby minimizing exposure of the object to radiation administered during the scan. Typically, a half-scan may be employed to acquire imaging data from an angular range of at least 180 degrees plus a fan angle of an X-ray tube. The acquired imaging data may be used for reconstructing the initial image using one or more reconstruction techniques, such as but not limited to, a short-scanning technique, a half scanning technique, a Feldkamp-Davis-Kress (FDK) reconstruction technique, tomography-like reconstructions, iterative reconstructions, a reconstruction using optimally weighted over-scan data comprising the fan angle of the X-ray beam (Butterfly reconstruction), or combinations thereof.

Efficient location of the object of interest in the one or more reconstructed images may be facilitated by identifying one or more ROIs corresponding to the object of interest at step 304. In one embodiment, identifying the one or more ROIs includes generating a representation of a centerline path corresponding to at least a portion of the object of interest, such as, the coronary artery. In one embodiment, the centerline may be identified by using segmentation. Alternative embodiments, however, may employ one or more non-segmentation techniques for identifying the centerline. The non-segmentation techniques rely on detecting one or more fundamental properties that reflect how a modality images a contrast medium inside a cylindrically shaped vessel. Further, a specific signature of the vessel may be detected. In CT, for example, a system point spread function of a scanner, a spatial resolution, and the vessel size combine to form a specific signature of the vessel. This signature may be detected either by using a matched-filter based approach or by using Eigen analysis based approach. The matched-filter approach employs directional filters that respond strongly to vessel patterns. The Eigen analysis based approach uses an intrinsic shape of the intensity iso-surfaces encoded in a second-order structure (the Hessian) of image intensity. Typically, the Hessian may be considered a good measure of a shape of a structure of interest, such as, the centerline of the coronary artery.

Implementation of one or more of these approaches identifies a centerline that corresponds to a set of coordinate positions that define the coronary artery centerline including branch points. It may be noted that the exemplary method works more efficiently for coronary segments that have centerlines that intersect the axial construction plane at a significant angle, for example, more than 10-15 degrees. Coronary artery centerlines that are nearly parallel to the axial construction plane, and therefore orthogonal to the z-axis of a CT scanner, typically have good temporal resolution as the centerlines may be defined by a small segment of view angles. A different reference phase may, therefore, be selected for different positions along the centerline to ensure that there are no temporal disconnects between coronary segments whose centerlines intersect the axial construction plane at a significant angle and those segments whose centerlines are parallel to the axial construction plane. It may be noted, however, that selection of the different reference phase may require different reference positions along the centerlines for estimating the motion of the structure of interest. Further, in some embodiments, only regions at a determined distance from the identified centerlines may be further analyzed for estimating the motion of the object of interest. Such a focused analysis along the centerlines mitigates processing of a substantial amount of outlying data, thereby improving computational efficiency. Accordingly, the identified centerlines may be used to determine one or more ROIs corresponding to the object of interest in the one or more reconstructed images. Efficient identification of the centerlines, however, may depend upon the quality of the corresponding reconstructed images.

Selection of an appropriate reconstruction technique, therefore, is an important factor in generating a high quality image with good temporal resolution, particularly in case of CT imaging systems. Conventional reconstruction techniques typically employ a smooth view weighting function, such as a Parker weight, to minimize image artifacts. The weighting helps to properly handle data redundancy from a short scan trajectory. In particular, for rays going through the same location and at the same angle, at the start and at the end of the short scan, a suitable weighted average of corresponding attenuation values may be used. Although these rays may correspond to substantially the same line integrals, the data may be acquired at different points in time. Therefore, a desired correlation between filling of a Fourier space and an angular position of an associated source, such as the radiation source 14 based on the acquired data may no longer be valid. Typically, a valid correlation between the Fourier space and the angular source position exists for frequencies that correspond to the data acquired near the middle of the short scan as there is no data redundancy for such frequencies. However, data from view angles near one end of the scan contribute to regions in the Fourier space that are also filled in by view angles acquired at a substantially different time, for example, near the end of the scan. Use of such data acquired at the end of the scan may introduce artifacts, thereby negatively affecting motion estimation and motion compensation processes.

Therefore, in one embodiment, the Butterfly reconstruction technique may be employed to generate two reconstructions with minimal artifacts. One of the two reconstructions may be weighted more heavily at the beginning of the short scan, and the other may be weighted more heavily at the end of the short scan. Optionally, the Butterfly technique may also employ a Fourier domain mask or a weighting function to reduce cone beam artifacts and minimize the contribution of data acquired at views far from the center view. In one embodiment, the Fourier domain mask may be selected such that the mask value is "1" in two opposing quadrants of Fourier space (2D) and "0" in the other two quadrants. Additionally, it may be ensured that the selected mask is a smooth so that there is no sharp transition from "0" to "1" at the quadrant boundaries. Further, the two reconstructed images may be transformed into the Fourier domain and the mask may be multiplied by one of the transformed images. Moreover, the conjugate of the mask (1 minus the mask) may be multiplied by the other transformed image. The results of the two multiplication operations may be added and then transformed back into an image space. Therefore, the two reconstructions that employ the Butterfly technique may require only minimal smoothing of redundant data even at transition frequencies.

In other embodiments, two or more half-scan reconstructions may be used to avoid ambiguity in the acquired data at the start or end of the scan. In yet another embodiment, a single half-scan may be used to acquire data wherein redundant information from the start and end locations of the scan may be used to estimate object motion. Subsequently, the acquired data may be used to reconstruct two shifted images. By way of an example, a first image may be reconstructed using data acquired from an angular space corresponding to 0 to 180 degrees. A second image may be reconstructed using data acquired from an angular space that is offset by an angle α from the angular space corresponding to the first image. The second image, for example, may be reconstructed using data acquired from the angular space corresponding to 60 to 240 degrees.

Subsequently, one or more ROIs may be identified from the one or more reconstructed images. Particularly, the ROIs may be identified in a vicinity of the identified centerlines. The ROIs may correspond to structures such as a coronary artery, a coronary valve, a heart chamber, the whole heart, or a lung nodule and so on. In one embodiment, an operator of an imaging system may select a particular ROI from the one or more reconstructed images for further processing. By way of an example, the operator may select a coronary artery from an image of a heart available on a display device coupled to a CT system or a post-processing workstation for motion estimation and compensation. To that end, the one or more reconstructed images may be sent to a workstation or a computing device communicatively coupled to the CT system for identifying the relevant ROIs. As previously noted, the identification of the relevant ROIs may be achieved by employing segmentation or highlighting with a matched-filter based approach, an Eigen analysis based approach, and so on.

For facilitating efficient estimation of motion of the identified ROIs, the one or more reconstructions may subsequently be filtered with directional filters. Particularly, a set of directional filters may be applied to the identified ROIs to generate a sequence of filtered images at step 306. In one embodiment, substantially the same filter may be applied to the identified ROIs in the one or more reconstructions. Further, in accordance with aspects of the present technique, each of the set of directional filters highlights information acquired near a different reference point. In different embodiments, the reference point may correspond to a particular instant of time, a view angle corresponding to a source location, or an angular interval in the Fourier space. Accordingly, the information may be acquired in a short time interval during the scan and may correspond to a desired section of a Fourier space.

In order to limit influence of data acquired at substantially different instants of time, the data not corresponding to the desired section of the Fourier space needs to be filtered out. Design of appropriate image filters is, thus, an important factor affecting the quality of the final CT image. Therefore, filters are designed to have Fourier transforms that are smooth and each filter may be constrained to a certain pair of opposing sections in the Fourier space. Particularly, the filters may be designed such that they correspond to time intervals around the instants in time that may be selected for analysis. Alternatively, the filters may be designed such that they correspond to angular intervals around angular source positions that may be selected for analysis. In one embodiment, the selected angular intervals may correspond to view angles that are shifted by 5-10 degrees.

Moreover, the filters may be aligned along one or more desired directions in the Fourier space. In one embodiment, each desired direction may correspond to a plane containing a certain line "L" that is parallel to a scanner axis and includes an identified ROI. Additionally, the plane corresponding to the desired direction may intersect a source trajectory at a determined number of points, for example, at two points in case of a circular trajectory. In one embodiment, a weighting function may be implemented such that for planes in most orientations, the ray acquired at one of the intersection points is assigned a higher weight and the ray acquired at the other point is assigned a lower weight. A plane that is oriented such that the two opposing views are equally weighted may be considered as a critical plane. In accordance with aspects of the present technique, the direction along an intersection of the critical plane and an imaging surface may be considered representative of a critical direction. Accordingly, each filter may be oriented along a desired direction centered on the critical direction.

Figure 4:
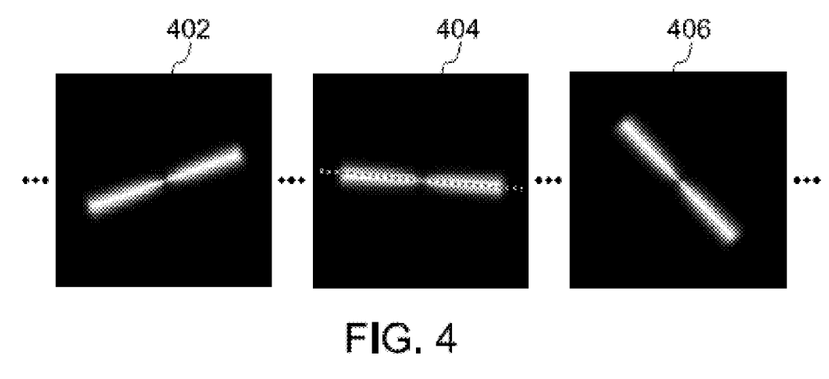
FIG. 4 is a pictorial view depicting orientation of selected filters along a series of directions centered on a critical direction described with reference to FIG. 3.

FIG. 4 illustrates exemplary orientations of the filters along the desired directions. As depicted in FIG. 4, each of the filters 402, 404 and 406 is generally constrained to lie in a conjugate pair of opposing sections in Fourier space and in a band of Fourier space centered at the origin. It may be noted that the central filter 404 is aligned along the critical direction.

Additionally, while designing appropriate filters, the impulse response to data corresponding to desired sections of the Fourier space may be evaluated. Typically, the impulse response to data corresponding to only one section of the Fourier space is spread out spatially resulting in distant blurring. In one embodiment, filters with compact spatial representations may be designed to mitigate this blurring effect. In some embodiments, the filter design may be performed by utilizing an optimization procedure that uses a Fourier transform to switch between a spatial domain and a Fourier domain. Such an optimization procedure appropriately adjusts a ratio between a spatial compactness constraint and a temporal compactness constraint until a steady state is attained. Based on application requirements, in some embodiments, the ratio may be adjusted such that some filters may have high angular compactness and a very short time interval. In other embodiments, however, the ratio may be adjusted such that the filters may be sensitive to data acquired in a broader time interval but may have a highly compact spatial representation, thereby producing better image quality.

Further, in accordance with aspects of the present technique, the filters may be designed in the Fourier domain, a 2D domain, a 3D domain, a wavelet domain, a time-frequency domain, or a projection domain. In some embodiments, the filters may also be designed in the spatial domain as matched filters that are adapted to features such as edges or round structures. The round structures may correspond to a cross-section of coronary arteries that are blurred along the direction of the rays passing through the associated ROI at a particular instant of time. The filters, thus designed and selected may be applied to the one or more of reconstructed images to generate a sequence of one or more filtered images with better temporal resolution than the corresponding initially reconstructed images.

Although the series of filters may repeat every 180 degrees, the generated sequence of filtered images may represent more than the time it takes to acquire 180 degrees of data. This extension beyond 180 degrees may be achieved by applying the filters to different images, where each of the different images may be built from data acquired during a unique angular range. In one embodiment, the sequence of filtered images may comprise a first reconstruction filtered over the first half of the available angular range and a second reconstruction filtered over the remaining of the angular range. In other embodiments, the sequence of filtered images may be obtained from different combinations or weightings of the filtered reconstructions. The sequence of filtered images, thus obtained, may provide relevant information that may be employed in the estimation of object motion. A method for applying the selected filters to the one or more reconstructed images to obtain relevant information for motion estimation will be described in greater detail with reference to FIG. 5.

Figure 5:
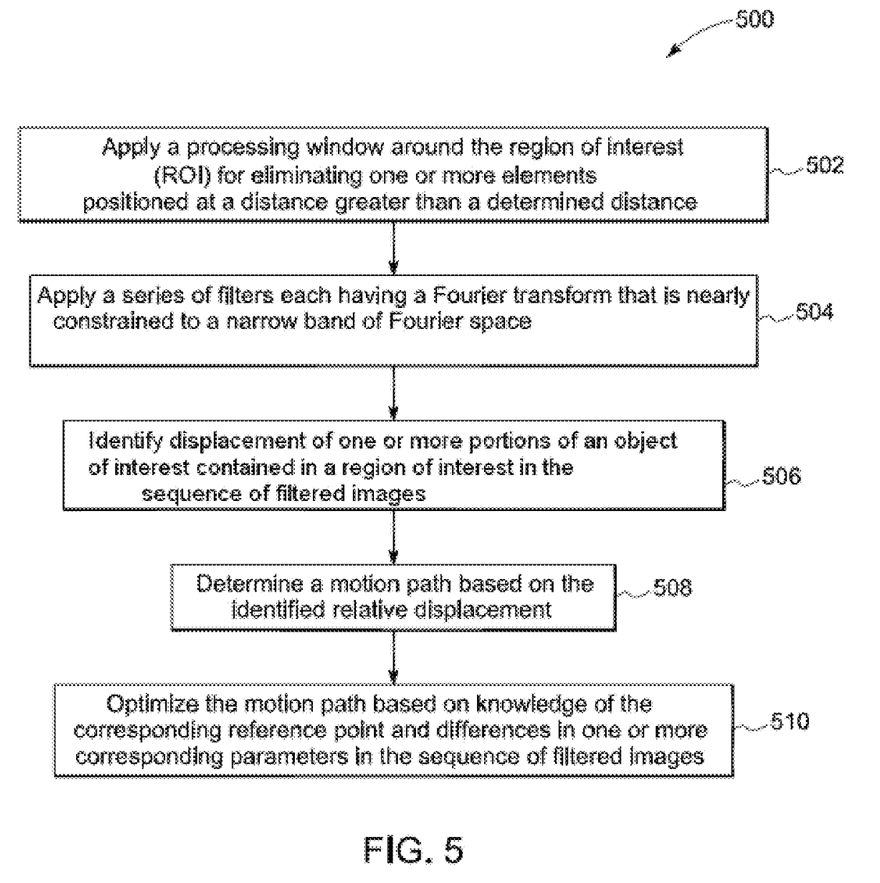
FIG. 5 is a flowchart depicting an exemplary method for applying a set of filters to the reconstructed image for estimating a motion path of an object described with reference to FIG. 3.

FIG. 5 illustrates a flowchart 500 depicting an exemplary method for applying the directional filters to the reconstructed images for estimating a motion path of an object or a structure of interest as described with reference to FIG. 3. At step 502, the smooth processing window may be applied to the ROI such that elements that are positioned at a distance greater than a determined distance from the object of interest are discarded. The elements positioned farther than the determined distance may be representative of outliers that distort computations relating to the motion estimation and compensation processes, and therefore, may be filtered out by applying the processing window. The size of the window is adapted to the size and the expected range of motion of the ROI. It may be noted that the ROI may include at least a portion of the object of interest. In one embodiment, the directional filters may be applied at step 504 to images generated by applying a smooth processing window centered on a selected ROI in the shifted reconstructed images.

In an alternative embodiment, however, the smooth processing windows may not be employed. Instead, the directional filters may be applied directly to the two reconstructed images. Each of the directional filters may include a Fourier transform that is nearly constrained to a narrow band of the Fourier space that is centered on the ROI. In either case, a sequence of filtered images that correspond to a subset of an angular range of the projection data with better temporal resolution may be generated. Particularly, one or more pairs of frames may be generated from the sequence of filtered images by applying substantially the same filter to two different initial reconstructions.

As previously noted, each filter may correspond to a desired direction. Further, each desired direction may be measured twice, thereby corresponding to two instants of time. A correlation between the desired direction and the particular instant of time for obtaining data corresponding to a ROI may be defined by a weighting function. In one embodiment, the weighting function may be based on information obtained from an electrocardiogram signal corresponding to a patient. The weighting function may be centered on an instant of time taken as a reference point at which the heart is most stable. Based on the knowledge of the reference point and the view angle, the weighting function may help in determining a correspondence between spatial frequencies in an image and the corresponding view angles at which the spatial frequencies are acquired. As the view angle is linear with time, the weighting function may also determine the time at which each spatial frequency is acquired by the system. In one embodiment, the acquired spatial frequency may then be used to identify relative displacement of the ROI between one or more pairs of the filtered images in the sequence of filtered images at step 506. To that end, one or more pairs of frames from the sequence of filtered images may be selected.

Subsequently, motion vectors corresponding to each ROI within the sequence of filtered images may be estimated at step 508 for estimating the corresponding motion. Particularly, the motion vectors are estimated based on determined displacements of the identified ROI in the sequence of filtered images from a particular reference point. Thus, the relative displacements of a portion of the object of interest over a period of time may be identified by analyzing the two frames in each selected pair of frames. Particularly, in one embodiment the location of a bright spot corresponding to the portion of the object of interest in the sequence of filtered images may be identified. It may be noted that if the object of interest moves during data acquisition, the bright spot in the sequence of filtered images is also displaced. Accordingly, the identified relative displacements of the bright spot in the sequence of filtered images provides an initial estimate of a position of the portion of the object of interest at a particular instant of time.

Figure 6:
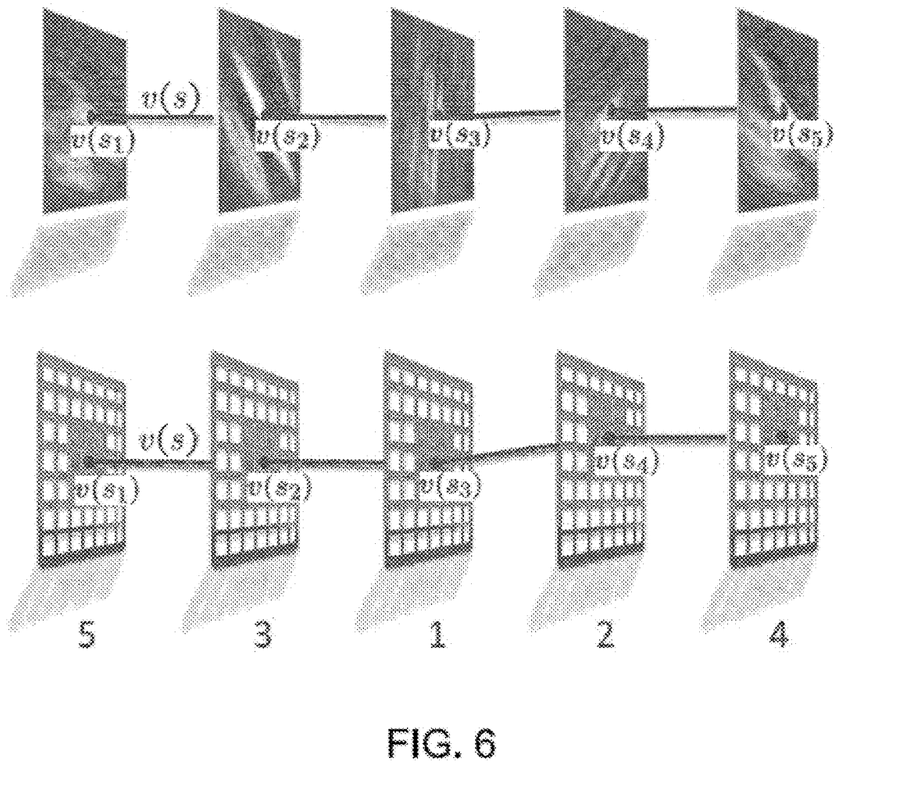
FIG. 6 is a deformable string model connecting across a plurality of images for estimating a motion path of an object, in accordance with aspects of the present technique.

In one embodiment, a deformable model comprising nodes corresponding to a location of the structure of interest in the sequence of filtered images may be employed for motion estimation. The nodes across all the images may be connected sequentially to form a string such that the node on one image may be connected to the node on a previous image and to a node on a subsequent image. FIG. 6 shows a string connecting a sequence of five images. The string is subsequently deformed under a set of internal and external forces such that each node aligns itself along the location of the object of interest in the corresponding image. The external forces may be used in the string model to attract each node to the locally brightest spot. In one embodiment, this external force may correspond to image intensity. The internal forces, however, may be used to control the stretching, bending and drift of the string to keep nodes in the string from wandering towards disparate spots. In some embodiments, these internal forces may drive adjacent nodes towards regions with locally similar appearance. To that end, a normalized correlation in small neighborhoods around nodes from directionally adjacent filtered images may be used to force nodes to settle on corresponding regions of similar appearance. It may be noted that the use of normalized correlation eliminates effects of varying contrast between filtered images from adjacent directions.

Upon combining the internal and external forces, an objective function corresponding to the deformable string model may be formulated. The string objective function may be solved to for estimating object motion by using a variety of local and global optimization methods, such as gradient descent, simulated annealing, and so on. In one embodiment, a discrete optimization approach that leverages the construction of an objective function corresponding to motion estimation parameters and motion tolerances may be employed to estimate the motion path. In another embodiment, a user could interactively determine a motion path.

Referring again to FIG. 3 now, at step 308, a motion path corresponding to the ROI based on one or more correspondences in the sequence of filtered images may be determined. In one embodiment, differences in corresponding parameters in two or more filtered images in the sequence of filtered images may be determined. In one embodiment, the corresponding parameters may include the location of the ROI estimated at a particular instant of time and for a particular view angle. In another embodiment, the initial estimates determined at step 508 of FIG. 5 may be employed to provide an estimation of the motion path of the ROI. In a further embodiment, the motion path of the ROI may be estimated by using a model for the motion that encourages smoothness, incorporates confidence information for each component of each displacement based on directional properties of the filter, or combinations. The motion estimation of the ROI may be further augmented by using pair-wise cross-correlation of the directionally filtered images to estimate relative translation of at least the portion of the object of interest included in the ROI during a 180 degree rotation. This type of relative translation is easy to estimate because the same frequencies are acquired at these two time points. Particularly, a simple cross correlation between the two images may be employed to estimate the motion between the two time points.

With returning reference to FIG. 5, the estimated motion path may be optimized by implementing an optimization procedure at step 510 to determine a final motion path corresponding to the ROI. In accordance with aspects of the present technique, the optimization procedure may be based on physics based constraints and a priori knowledge about the motion and the directions that are more susceptible to errors during data acquisition. Accordingly, a smooth function such as a low order polynomial or a Fourier series may be imposed on the estimated motion paths while optimizing motion of physical objects. Further optimization may be achieved by using the a priori knowledge to correct object motion. In one embodiment, the a priori knowledge may include knowledge of the corresponding reference point such as source position at a particular instant of time and knowledge of directions along which significant blurring may be experienced. For example, the blurring may be strongest in a direction parallel to rays acquired at a time that is being highlighted by the filter. The optimization procedure, therefore, may use this knowledge for estimating the motion of the structure of interest.

In one embodiment, the optimization procedure may be performed, for example, using a regularized least squares matrix. It may be noted that regularization of the motion vectors may be done by implementing multiple iterations to take advantage of mutual information from adjacent image regions or z-slices. The regularization may be implemented by smoothing and regularizing the estimated motion vectors towards the previous set of vectors in the following iteration. In alternative embodiments, however, such an optimization may not be necessary. This may apply to embodiments where more than one radiation source is employed for acquiring data from a plurality of directions. In such embodiments, the resultant motion estimated image may exhibit comparatively good temporal resolution without the application of the optimization procedure.

Optionally, the motion vectors estimated by the exemplary motion estimation method described with reference to FIG. 3 may be input to a motion compensation system for compensating for estimated motion. In one embodiment, motion compensation may be carried out in the Fourier space using properties of a Fourier transform. An embodiment of a motion compensation technique, in accordance with aspects of the present technique, is discussed in greater detail with respect to FIG. 7.

Figure 7:
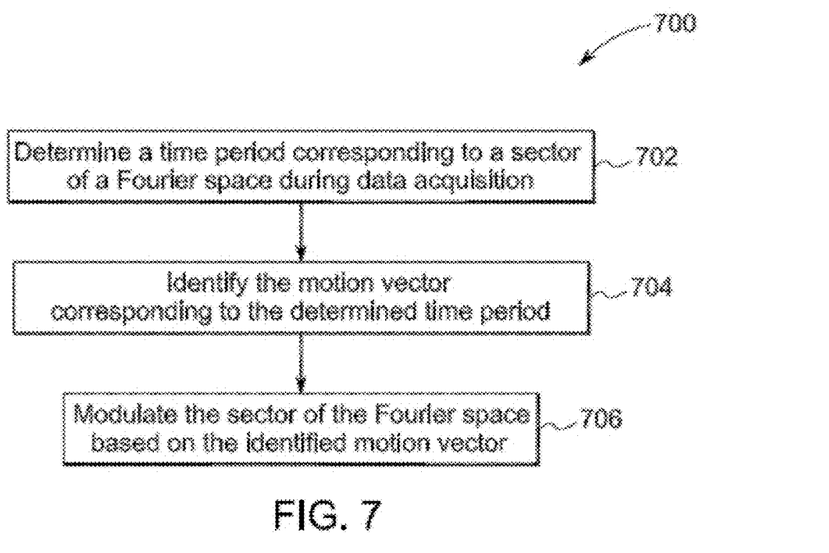
FIG. 7 is a flowchart depicting an exemplary method for CT motion compensation, in accordance with aspects of the present technique.

Turning to FIG. 7, a flowchart 700 illustrates an exemplary motion compensation technique. The method begins at step 702 by determining the instant in time when the projection direction relative to the object of interest is orthogonal to a particular section in a Fourier space. Further, at step 704, a motion vector corresponding to a determined displacement of the object of interest from a reference point in the determined instant in time is evaluated. In one embodiment, the motion vector is a component of object motion that is orthogonal to the projection direction. Subsequently, the evaluated motion vector along with dot product of a unit vector in the direction corresponding to the particular section of the Fourier space may be used to modulate the corresponding section at step 706. Particularly, a complex exponential may be used to modulate the Fourier representation of the corresponding image upon movement of the object. Accordingly, a phase shift may be applied along one or more sections of the Fourier space corresponding to small regions of the image as object motion is fairly rigid in a smaller region. The phase shift compensates for the estimated motion of each segment corresponding to the phase shifted section of the Fourier space. The result of motion compensation for each structure of interest may then be blended into the original image to generate a reconstructed image having substantially enhanced resolution. To that end, a plurality of motion compensated images may be combined with other images by using one or more masking techniques such as an image domain mask.

Here, it may be noted that while FIG. 3 depicts an exemplary motion estimation method, FIG. 7 relates to an exemplary motion compensation method that may be used to greatly enhance the temporal resolution of reconstructed CT images. In different embodiments, the disclosed motion estimation and motion compensation methods may be used together, or alternatively, or may be used in conjunction with other methods for addressing various imaging issues. The exemplary motion estimation method, for example, may be combined with another compensation technique, such as image reconstruction using image-grid warping. Image-grid warping may include warping a reconstruction grid by utilizing the estimated motion path before backprojecting the acquired projection data. Similarly, a different motion estimation technique may be combined with the exemplary motion compensation method presented in FIG. 7 to generate images with better temporal resolution.

Application of both of the exemplary motion estimation and motion compensation techniques generates images with substantially improved resolution as these techniques significantly reduce motion artifacts in the reconstructed images. These reconstructed images may be used to facilitate substantially accurate diagnosis, especially relating to heart diseases. Radiologists typically use images of the entire coronary artery to diagnose a stenosis or plaque. However, the image artifacts introduced by conventional reconstruction methods may result in erroneous determination of artery diameter, and therefore are seldom relied upon as the only means for diagnosis. Therefore, it is important for the reconstructed image to provide an accurate measure of the diameter of the vessel. By way of example, in one reconstruction that employed a conventional reconstruction technique, the diameter of the coronary artery was determined to be about 3.6 mm due to presence of artifacts. However, upon applying the exemplary motion estimation and motion compensation methods the diameter of the coronary artery was determined to be about 2.2 mm, thus providing a 31% improvement over conventional reconstructions. Employing the disclosed techniques, thus, may help in avoiding the need for expensive and invasive catheterization and other additional diagnostic procedures to facilitate diagnosis.

The plurality of systems and methods disclosed herein above, thus, provide an efficient technique for improving temporal resolution of images by estimating object motion and compensating for the estimated object motion. The disclosed technique reduces motion induced blurring, thereby enabling generation of high quality images that allow for better diagnosis. Further, the disclosed techniques estimate motion directly from a single or a few reconstructed images or an image volume. Additionally, in embodiments including multiple reconstruction phases, projection data is not used again beyond a first reconstruction if both of the exemplary motion estimation and compensation techniques are implemented simultaneously. However, the projection data may be used again in an embodiment, where it is desirable to use the exemplary method only to estimate the motion and subsequently use the estimated vectors in a second pass motion compensated reconstruction. Furthermore, substantial improvement in image resolution achieved by implementing the disclosed techniques renders the imaging systems as cost effective diagnostic tools.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for estimating motion of an object of interest, comprising:
reconstructing a set of one or more initial images using acquired data;
identifying one or more regions of interest in the set of reconstructed initial images;
applying at least a set of directional Fourier filters to the identified regions of interest to generate a sequence of filtered images constrained in Fourier space, wherein each of the filtered images in the sequence comprises data acquired near a different reference point; and
estimating a motion path for each region of interest based on one or more correspondences in the sequence of filtered images.

2. The method of claim 1, wherein the region of interest comprises at least a portion of the object of interest.

3. The method of claim 2, wherein the object of interest comprises a coronary artery, a coronary valve, a heart chamber, the whole heart, or a lung nodule.

4. The method of claim 1, wherein reconstructing the initial image is performed using a short scan technique, a Feldkamp-Davis-Kress reconstruction technique or a "Butterfly" reconstruction.

5. The method of claim 1, wherein identifying the one or more regions of interest comprises employing a segmentation technique, a matched-filter based approach, an Eigen analysis based approach, or combinations thereof.

6. The method of claim 1, wherein the reference point comprises one of a particular instant of time, a view angle corresponding to a source location, or an angular space in a Fourier domain.

7. The method of claim 1, wherein identifying the one or more regions of interest comprises generating a representation of a centerline path for at least a portion of the object of interest.

8. The method of claim 7, wherein applying the set of filters comprises designing a set of filters that suppress the influence of data that was not acquired near a particular reference point.

9. The method of claim 1, wherein estimating a motion path, comprises:
identifying the displacements of one or more portions of an object of interest contained in a region of interest in the sequence of filtered images; and
determining a motion path based on the identified displacements.

10. The method of claim 1, wherein reconstructing the set of one or more initial images comprises reconstructing two or more initial images.

11. The method of claim 10, wherein estimating the motion path of a portion of an object of interest comprises:
selecting one or more pairs of frames from the sequence of filtered images wherein the two frames of each selected pair are generated by applying substantially the same filter to two different initial reconstructions;

identifying the relative displacement of a portion of the object of interest between the two frames in each selected pair of frames; and determining the motion path based on the identified relative displacements.

12. The method of claim 1 wherein estimating a motion path comprises one of using a model for the motion that encourages smoothness, incorporates confidence information for each component of each displacement based on directional properties of the filter, or combinations thereof.

13. The method of claim 12, wherein estimating a motion path further comprises using a string model, a normalized correlation, or a combination thereof.

14. The method of claim 1, wherein the set of filters operate in a Fourier domain, a spatial domain, a wavelet domain, a time-frequency domain, a three-dimensional domain, a two-dimensional domain, a projection domain, or combinations thereof.

15. The method of claim 1, wherein applying the set of filters comprises designing the set of filters, wherein an impulse response of each of the set of filters comprises a high spatial compactness, a high angular compactness, a correspondence with a particular reference point, or combinations thereof.

16. The method of claim 1, further comprising compensating for motion of the object of interest.

17. The method of claim 16, wherein compensating for motion of the object of interest comprises warping a reconstruction grid using the estimated motion path before backprojecting the acquired data.

18. An imaging system, comprising:
a data acquisition system (DAS) for acquiring an initial image; and
an image processor for:
reconstructing a set of one or more initial images using acquired data;
identifying one or more regions of interest in the set of reconstructed initial images;
applying at least a set of filters to the identified regions of interest to generate a sequence of filtered images, wherein each of the filtered images in the sequence comprises data acquired near a different reference point; and
estimating a motion path for each region of interest based on one or more correspondences in the sequence of filtered images;
wherein each filter in the set of filters comprises a filter constrained to lie in a conjugate pair of opposing sections in Fourier space and in a band of Fourier space centered at the origin.

19. The imaging system of claim 18, wherein the reference point comprises one of a particular instant of time, a view angle corresponding to a source location, or an angular space in a Fourier domain.

20. The imaging system of claim 18, wherein the image processor further compensates for the estimated motion.

21. The imaging system of claim 18, wherein the data acquisition system comprises a computed tomography (CT) system, a multi-source imaging system, multi-detector imaging system, an X-Ray system, positron emission tomography (PET) scanner, a single photon emission computed tomography (SPECT) scanner, a microscope, a digital camera, a charge coupled device, or combinations thereof.

22. A computed tomography (CT) system, comprising:
at least one radiation source, for generating a conical beam for imaging an object, wherein the at least one radiation source and the object move relative to each other around a determined axis;
a detector assembly coupled to the at least one radiation source; and
a computing device coupled to detector assembly for estimating motion of the object,
wherein the computing device includes one or more image processors for:
reconstructing a set of one or more initial images using acquired data;
identifying one or more regions of interest in the set of reconstructed initial images;
applying at least a set of directional Fourier filters to the identified regions of interest to generate a sequence of filtered images constrained in Fourier space, wherein each of the filtered images in the sequence comprises data acquired near a different reference point; and
estimating a motion path for each region of interest based on one or more correspondences in the sequence of filtered images.

23. The CT system of claim 22, wherein the image processor further compensates for the estimated motion.

24. The CT system of claim 22, wherein the reference point comprises one of a particular instant of time, a view angle corresponding to a source location, or an angular space in a Fourier domain.

25. A method for estimating motion of an object of interest, comprising:
reconstructing a set of one or more initial images using acquired data;
identifying one or more regions of interest in the set of reconstructed initial images;
applying at least a set of filters to the identified regions of interest to generate a sequence of filtered images, wherein each of the filtered images in the sequence comprises data acquired near a different reference point; and
estimating a motion path for each region of interest based on one or more correspondences in the sequence of filtered images;
wherein reconstructing the set of one or more initial images comprises reconstructing two or more initial images; and
wherein estimating the motion path of a portion of the object of interest comprises:
selecting one or more pairs of frames from the sequence of filtered images, wherein the two frames of each selected pair are generated by applying substantially the same filter to two different initial reconstructions;
identifying the relative displacement of a portion of the object of interest between the two frames in each selected pair of frames; and
determining the motion path based on the identified relative displacements.

* * * * *

UNITED STATES PATENT AND TRADEMARK OFFICE
CERTIFICATE OF CORRECTION

PATENT NO. : 8,224,056 B2  
APPLICATION NO. : 12/638693  
DATED : July 17, 2012  
INVENTOR(S) : Pack et al.

Page 1 of 1

It is certified that error appears in the above-identified patent and that said Letters Patent is hereby corrected as shown below:

Title Page, Item (73), Assignee, delete "General Electronic Company" and substitute therefore -- General Electric Company --.

Signed and Sealed this
Twenty-fifth Day of September, 2012

David J. Kappos
*Director of the United States Patent and Trademark Office*